US008508342B2

(12) United States Patent
Deguchi et al.

(10) Patent No.: US 8,508,342 B2
(45) Date of Patent: Aug. 13, 2013

(54) TRANSMITTING / RECEIVING ANTENNA AND TRANSMITTER / RECEIVER DEVICE USING THE SAME

(75) Inventors: Futoshi Deguchi, Fukuoka (JP); Youichirou Honda, Fukuoka (JP); Masaaki Sano, Fukuoka (JP)

(73) Assignee: Panasonic Corporation, Osaka (JP)

( * ) Notice: Subject to any disclaimer, the term of this patent is extended or adjusted under 35 U.S.C. 154(b) by 533 days.

(21) Appl. No.: 12/732,580

(22) Filed: Mar. 26, 2010

(65) Prior Publication Data

US 2011/0115607 A1 May 19, 2011

(30) Foreign Application Priority Data

Nov. 19, 2009 (JP) ................................ 2009-263737
Nov. 19, 2009 (JP) ................................ 2009-263738
Nov. 19, 2009 (JP) ................................ 2009-263739

(51) Int. Cl.
*H04Q 5/22* (2006.01)
*G08B 13/14* (2006.01)

(52) U.S. Cl.
USPC . 340/10.1; 340/10.5; 340/572.7; 340/539.11; 235/492; 235/375

(58) Field of Classification Search
USPC ............ 340/10.1-10.5, 572.7, 572.4, 539.11; 343/744, 867; 235/492, 375, 487
See application file for complete search history.

(56) References Cited

U.S. PATENT DOCUMENTS 4,922,261 A 5/1990 O'Farrell
5,061,941 A 10/1991 Lizzi et al.
5,602,556 A 2/1997 Bowers
6,072,383 A * 6/2000 Gallagher et al. ........... 340/10.2
6,208,235 B1 * 3/2001 Trontelj ....................... 340/10.1
6,584,301 B1 6/2003 Bohn et al.
6,917,335 B2 * 7/2005 Kadambi et al. ....... 343/700 MS
7,154,449 B2 * 12/2006 Liu et al. ....................... 343/867
7,245,222 B2 * 7/2007 Bierach ...................... 340/572.4
7,446,729 B2 * 11/2008 Maruyama et al. ........... 343/867
7,728,785 B2 * 6/2010 Ozden ........................... 343/866
7,876,227 B2 * 1/2011 Bellows ..................... 340/572.7

(Continued)

FOREIGN PATENT DOCUMENTS

EP 0440370 8/1991
EP 1837951 9/2007

(Continued)

OTHER PUBLICATIONS

Search report from European Patent Office (E.P.O.), mailed Mar. 7, 2011.

*Primary Examiner* — Nam V Nguyen
(74) *Attorney, Agent, or Firm* — Greenblum & Bernstein, P.L.C.

(57) ABSTRACT

The present invention is concerned with a transmitting/receiving antenna, which includes a dielectric board, a driven loop antenna provided to the dielectric board, transmit processing portion connection terminals connected to the driven loop antenna, a transmitting/receiving loop antenna arranged in close vicinity to the driven loop antenna in a non-contact state, a resonance capacitor connected to both ends of the transmitting/receiving loop antenna, and receive processing portion connection terminals connected to the transmitting/receiving loop antenna. The driven loop antenna is constructed to have a loop wound in a single turn, and the transmitting/receiving loop antenna is constructed to have a loop wound in plural turns. According to this configuration, a wider frequency band of the frequency characteristic and a reduction of the power consumption can be achieved.

13 Claims, 13 Drawing Sheets

(56) References Cited

U.S. PATENT DOCUMENTS

| | | | | |
|---|---|---|---|---|
| 7,978,141 | B2 * | 7/2011 | Chi et al. | 343/741 |
| 8,174,454 | B2 * | 5/2012 | Mayer | 343/725 |
| 8,177,137 | B2 * | 5/2012 | Arai | 235/492 |
| 8,188,933 | B2 * | 5/2012 | Nakamura et al. | 343/788 |
| 2006/0012482 | A1 * | 1/2006 | Zalud et al. | 340/572.7 |
| 2008/0150693 | A1 * | 6/2008 | You et al. | 340/10.1 |
| 2009/0046029 | A1 | 2/2009 | Nagai | |
| 2009/0179812 | A1 | 7/2009 | Nakamura et al. | |
| 2009/0256777 | A1 | 10/2009 | Nagai | |

FOREIGN PATENT DOCUMENTS

| | | |
|---|---|---|
| JP | 2001-326526 | 11/2001 |
| JP | 2007-199871 | 8/2007 |
| WO | 87/04865 | 8/1987 |
| WO | 96/41399 | 12/1996 |
| WO | 2009/136876 | 11/2009 |

* cited by examiner

TRANSMITTING / RECEIVING ANTENNA AND TRANSMITTER / RECEIVER DEVICE USING THE SAME

BACKGROUND

1. Field of the Invention

The present invention relates to a transmitting/receiving antenna for transmitting an electric power and transmit data to a radio communication medium such as an IC tag attached to a goods, a book, etc., a non-contact IC card used for personal authentication, or the like and receiving receive data from the radio communication medium, and a transmitting/receiving device using this transmitting/receiving antenna.

2. Description of the Related Art

Commonly, the system that is called the "non-contact IC card system" utilizes a frequency band of 13.56 MHz, for example. Such system is proceeding toward practical use in physical distribution systems, traffic system, commodity control system, book management system, personal authentication system, and others.

Concretely, the electric power and the transmit data are supplied to the radio communication medium such as the IC tag attached to the goods, the book, etc., the non-contact IC card used for the personal authentication, or the like from the transmitting/receiving antenna of the transmitting/receiving device.

Also, the receive data transmitted from the radio communication medium is received via the transmitting/receiving antenna, and is processed by the transmitting/receiving device.

Also, the utilization of the radio communication medium is proceeding recently in the fields of security system, electronic money, personal authentication, and the like. Such a demand is escalating that one transmitting/receiving device should be enabled to cope with the circumstances where plural types of communication systems whose communication method is different respectively are mixedly utilized.

Therefore, in order to fulfill such demand, i.e., in order to enable one transmitting/receiving device to cope with the circumstances where plural types of communication systems whose communication method is different respectively are mixedly utilized, such a proposal has been made that a wider frequency band of the frequency characteristic should be implemented by switching sequentially a plurality of resistors (resistance values) that are interposed into a transmitting/receiving channel of the transmitting/receiving antenna (see Patent Literature 1, for example).

Patent Literature 1: JP-A-2007-199871

As described above, in the technology disclosed in Patent Literature 1, a plurality of resistors (resistance values) connected to the transmitting/receiving antenna are switched sequentially to realize a wider frequency band of the frequency characteristic. In this case, as the result that the resistors are always interposed in the transmitting/receiving channel of the transmitting/receiving antenna, such a problem arises that a loss caused due to the resistors causes an increase in the power consumption.

SUMMARY

Therefore, it is an object of the present invention to attain a wider frequency band of the frequency characteristic, and also reduce power consumption.

In order to attain this object, a transmitting/receiving antenna of the present invention includes a dielectric board; a driven loop antenna provided to the dielectric board; transmit processing portion connection terminals connected to the driven loop antenna; a transmitting/receiving loop antenna arranged in close vicinity to the driven loop antenna in a non-contact state; a resonance capacitor connected to both ends of the transmitting/receiving loop antenna; and receive processing portion connection terminal connected to the transmitting/receiving loop antenna; wherein the driven loop antenna is constructed to have a loop wound in a single turn, and the transmitting/receiving loop antenna is constructed to have a loop wound in plural turns. As a result, the above expected object can be achieved.

It is another object of the present invention to make it difficult for a transmit signal, which is fed from the transmit processing portion connection terminal, to cause a crosstalk with a signal on the receive processing portion connection terminal side and, as a result, to improve reliability of the communication.

DETAILED DESCRIPTION

Embodiments of the present invention will be explained with reference to the drawings hereinafter.

(Embodiment 1)

Figure 1:
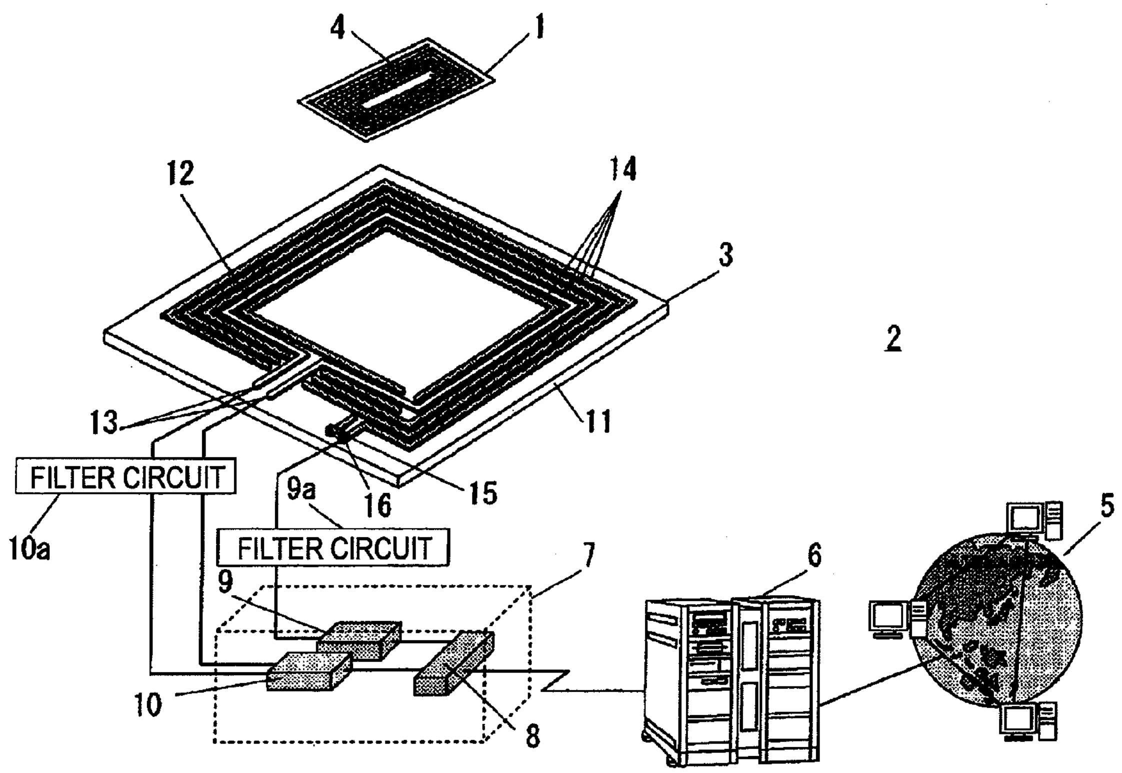
FIG. 1 is a block diagram showing a non-contact IC card system according to Embodiment 1 of the present invention.
Figure 2:
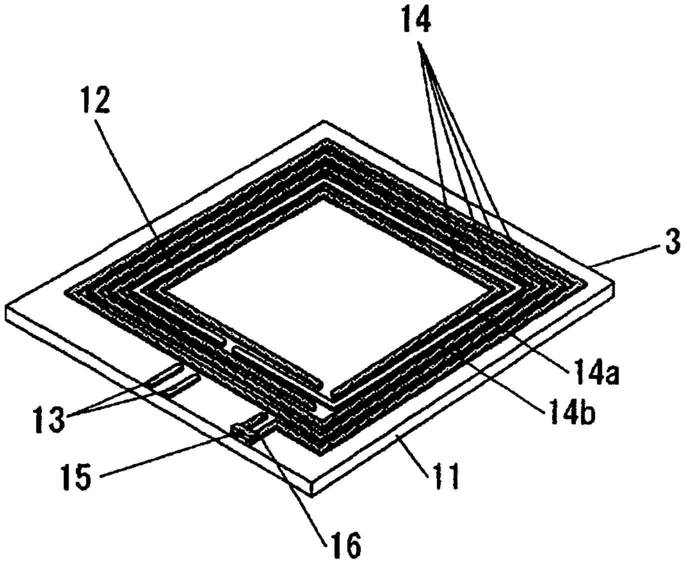
FIG. 2 is a perspective view showing a transmitting/receiving antenna of the same system.

FIG. 1 is a block diagram showing a non-contact IC card system according to Embodiment 1 of the present invention. The non-contact IC card utilizes a frequency band of 13.56 MHz, for example, and is utilized in the physical distribution systems, the traffic system, the commodity control system, the book management system, the personal authentication system, and others.

Concretely, the electric power and the transmit data are supplied to a radio communication medium 1 such as the IC tag attached to the goods, the book, etc., the non-contact IC card used for the personal authentication, or the like from a transmitting/receiving antenna 3 of a transmitting/receiving device 2.

The radio communication medium 1 is well known, and therefore its explanation will be made simply. The radio communication medium 1 is constructed by a transmitting/receiving loop antenna 4, and a control IC (not shown) connected to this transmitting/receiving loop antenna 4.

The transmitting/receiving device 2 is constructed by a control equipment 6 connected to a network line 5, and a reader-writer device 7 of this control equipment 6.

Also, the reader-writer device 7 is constructed by a controlling portion 8 connected to the control equipment 6, a receive processing portion 9 connected to the controlling portion 8, and a transmit processing portion 10.

Also, the transmitting/receiving antenna 3 is constructed to include a dielectric board 11, a driven loop antenna 12 provided on a surface of the dielectric board 11 by the printing, transmit processing portion connection terminal 13 connected to the driven loop antenna 12, a transmitting/receiving loop antenna 14 arranged in close vicinity to the driven loop antenna 12 in an electrically non-contact state, a resonance capacitor 15 connected to both ends of the transmitting/receiving loop antenna 14, and a receive processing portion connection terminal 16 connected to the transmitting/receiving loop antenna 14. Also, a loop center of the driven loop antenna 12 coincides with a loop center of the transmitting/receiving loop antenna 14.

Also, the transmit processing portion 10 is connected to the transmit processing portion connection terminal 13. Also, the receive processing portion 9 is connected to the receive processing portion connection terminal 16.

That is, the transmit signal from the transmit processing portion 10 is transmitted to the driven loop antenna 12 via a filter circuit 10*a* and the transmit processing portion connection terminal 13, then is transmitted to the transmitting/receiving loop antenna 14 in terms of the magnetic induction, and then is transmitted to the radio communication medium 1 from transmitting/receiving loop antenna 14.

The radio communication medium 1 receives the transmit signal by the transmitting/receiving loop antenna 4. As a result, the signal reception and the power supply are conducted.

Then, the transmit signal from the radio communication medium 1 is received by the transmitting/receiving loop antenna 14 provided to the transmitting/receiving antenna 3 of the reader-writer device 7. Then, this received signal is transmitted from the receive processing portion connection terminal 16 to the receive processing portion 9 via a filter circuit 9*a*, and then is transmitted to the control equipment 6 via the controlling portion 8.

As shown in FIG. 2 to FIG. 5, the driven loop antenna 12 is constructed to have a rectangular loop that is wound in a single turn, and the transmitting/receiving loop antenna 14 is constructed to have a rectangular loop that is wound in plural turns.

More concretely, as shown in FIG. 2 to FIG. 5, the driven loop antenna 12 is arranged between an inner loop antenna 14*a* constituting the transmitting/receiving loop antenna 14, and an outer loop antenna 14*b* arranged on the outside of this inner loop antenna.

Figure 3:
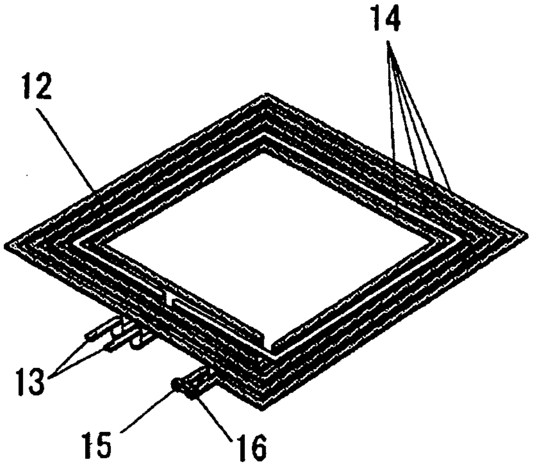
FIG. 3 is a perspective view of the principal part of the transmitting/receiving antenna.
Figure 4:
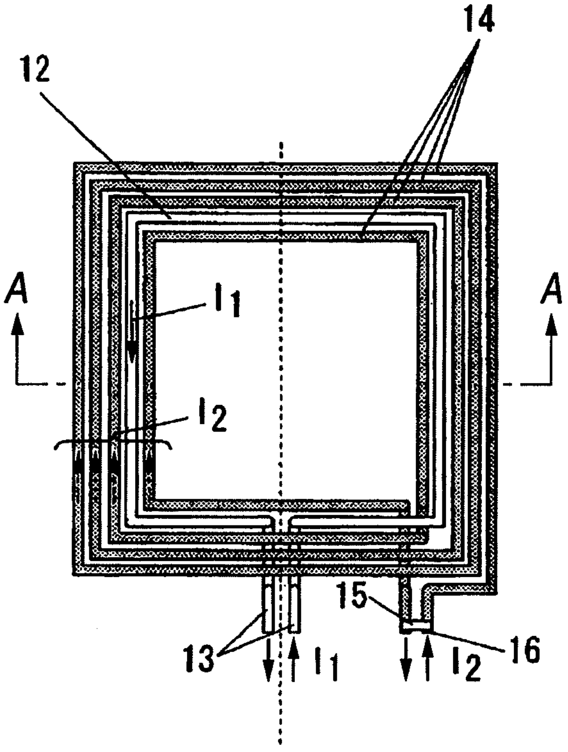
FIG. 4 is a plan view of the principal part of the transmitting/receiving antenna.
Figure 5:
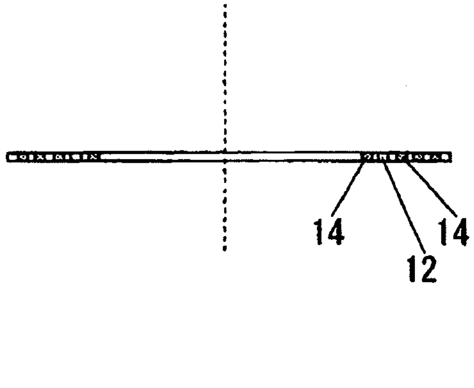
FIG. 5 is a sectional view of the principal part of the transmitting/receiving antenna (sectional view taken along an A-A line in FIG. 4).

Here, in FIG. 3 to FIG. 5, the dielectric board 11 is not illustrated on purpose so as to clarify structures of the driven loop antenna 12 and the transmitting/receiving loop antenna 14 and their mutual relationship.

Figure 6:
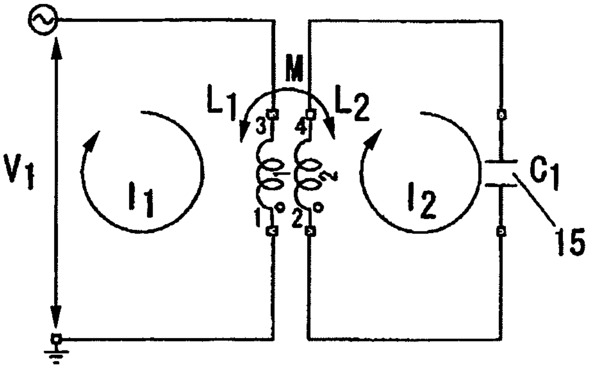
FIG. 6 is an equivalent circuit diagram of the transmitting/receiving antenna, which is expressed by using a transformer circuit.

Also, an equivalent circuit in which the transmitting/receiving antenna 3 constructed as above is replaced with a transformer circuit is shown in FIG. 6. Also, an equivalent circuit in which a coil is used instead of the transformer circuit is shown in FIG. 7.

Figure 7:
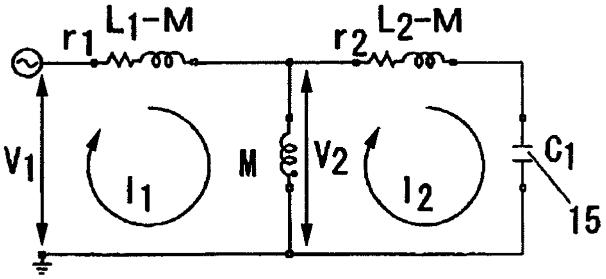
FIG. 7 is an equivalent circuit diagram of the transmitting/receiving antenna, which is expressed by using a coil.

As shown in FIG. 6 and FIG. 7, a primary inductance $L1$ indicates an inductance value that the driven loop antenna 12 contains. Also, a secondary inductance $L2$ indicates an inductance value that the transmitting/receiving loop antenna 14 contains.

Also, $V1$ is the voltage applied to the driven loop antenna 12, $r1$ is a resistance component. $r2$ is a resistance component of the transmitting/receiving loop antenna. $L1-M$, $L2-M$ are differences in which a mutual induction M is minus from respective inductance $L1$ and $L2$ in a case that a transformer circuit is not used.

A mutual induction that is produced due to an electromagnetic coupling exits between the primary inductance $L1$ and the secondary inductance $L2$.

An Equation 1 given as follows is held between a mutual inductance M of the mutual induction and the primary inductance $L1$ and the secondary inductance $L2$.

$$M=K\times\sqrt{(L1\times L2)} \quad \text{(Equation 1)}$$

where K denotes a coupling coefficient. This value K is in a range of $0\leqq K\leqq 1$. Therefore, a value of the mutual inductance M is increased as the coupling coefficient K is increased.

When a primary current $I1$ flows through the driven loop antenna 12, an induced voltage $V2$ is generated at the open end of the transmitting/receiving loop antenna 14 by the magnetic flux being generated by the primary current $I1$ via the mutual inductance M. Here, the resonance capacitor 15 ($C1$) is connected to the open end of the transmitting/receiving loop antenna 14. Thus, a secondary current $I2$ flows through a closed circuit that consists of the secondary inductance $L2$ and a capacitance $C1$.

Figure 8:
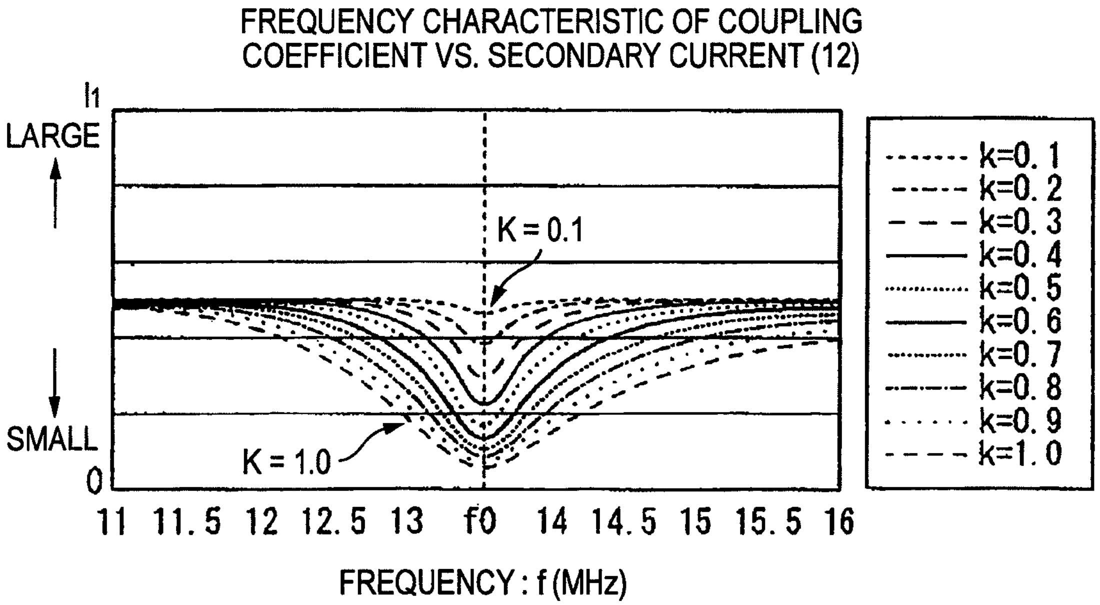
FIG. 8 is a frequency characteristic diagram of a primary current I1 of the transmitting/receiving antenna with respect to a coupling coefficient K.

The calculated results of the relationship between the frequency characteristic of the primary current I1 flowing through the driven loop antenna 12 and the coupling coefficient K are shown in FIG. 8.

It is appreciated from FIG. 8 that a value of the primary current I1 is decreased mainly around a resonance frequency f0 as a value of the coupling coefficient K comes closer to K=1, i.e., a value of the coupling coefficient K is increased, and a value of the primary current I1 in the frequency characteristic is decreased over a wider frequency band as a value of the coupling coefficient K is increased.

Figure 9:
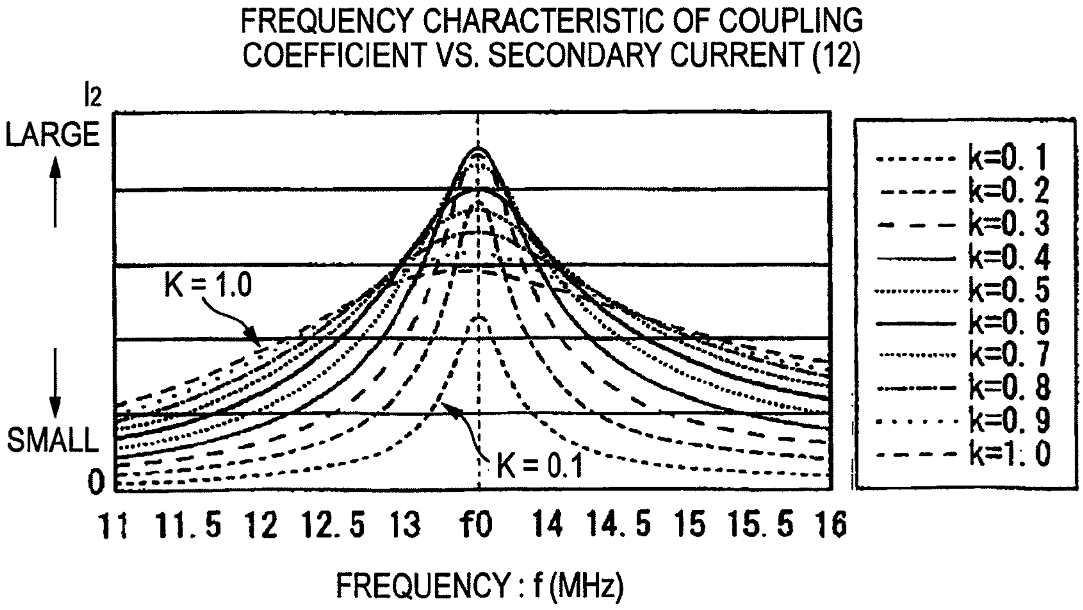
FIG. 9 is a frequency characteristic diagram of a secondary current I2 of the transmitting/receiving antenna with respect to a coupling coefficient K.

Next, the calculated results of the relationship between the frequency characteristic of the secondary current I2 flowing through the transmitting/receiving loop antenna 14 and the coupling coefficient K are shown in FIG. 9.

It is appreciated from FIG. 9 that a value of the secondary current I2 is decreased as a value of the coupling coefficient K comes closer to K=0, i.e., a value of the coupling coefficient K is decreased, a value of the secondary current I2 is increased gradually and also its frequency band is expanded mainly around a resonance frequency f0 as a value of the coupling coefficient K is increased, the secondary current I2 reaches a peak value (maximum value) at a certain value of the coupling coefficient K, and then the frequency band is continually expanded while a peak value of the secondary current I2 is decreased gradually.

Next, respective magnetic fluxes (magnetic field strength) generated by the driven loop antenna 12 and the transmitting/receiving loop antenna 14 will be explained hereunder.

Commonly, a magnetic field strength H that is generated by the primary current I1 flowing through a coil conductor is expressed by an Expression 2 given as follows.

$$H \propto L \times I \qquad \text{(Expression 2)}$$

where L is an inductance of the coil conductor.

That is, the magnetic field strength H is in proportion to a product of the inductance L and an electric current I flowing through the coil conductor.

Therefore, when the magnetic field is generated at the resonance frequency f0 by the primary current I1 flowing through the primary inductance L1 of the driven loop antenna 12, a magnetic field strength H1 of this magnetic field is proportional to a product of the primary inductance L1 and the primary current I1 flowing through the coil conductor.

Similarly, the magnetic field is generated at the resonance frequency f0 by the secondary current I2 flowing through the secondary inductance L2 of the transmitting/receiving loop antenna 14, a magnetic field strength H2 of this magnetic field is proportional to a product of the secondary inductance L2 and the secondary current I2 flowing through the coil conductor.

However, as shown in FIG. 4, respective flowing directions of the primary current I1 and the secondary current I2 are in the opposite direction, and also respective directions of the magnetic fluxes become opposite. Therefore, the canceling phenomenon of the magnetic fluxes occurs.

The magnetic field strength H, which is derived after the canceling phenomenon is taken into consideration, of the transmitting/receiving antenna 3 is given by subtracting the magnetic field strength H1 from the magnetic field strength H2.

That is, respective directions of the current flowing through the driven loop antenna 12 and the current flowing through the transmitting/receiving loop antenna 14 are in the opposite direction. Therefore, the magnetic flux generated as the result that the current flows through the driven loop antenna 12 acts to weaken the magnetic flux generated as the result that the current flows through the transmitting/receiving loop antenna 14.

In order to avoid this event, in Embodiment 1, the driven loop antenna 12 is constructed to have a loop wound in a single turn. Therefore, such a situation is suppressed that the magnetic flux of the transmitting/receiving loop antenna 14 is weakened.

Accordingly, even though a transmitting power of the driven loop antenna 12 is not increased, a sufficient amount of magnetic flux is generated from the transmitting/receiving loop antenna 14. As a result, the power consumption can be reduced.

Figure 10:
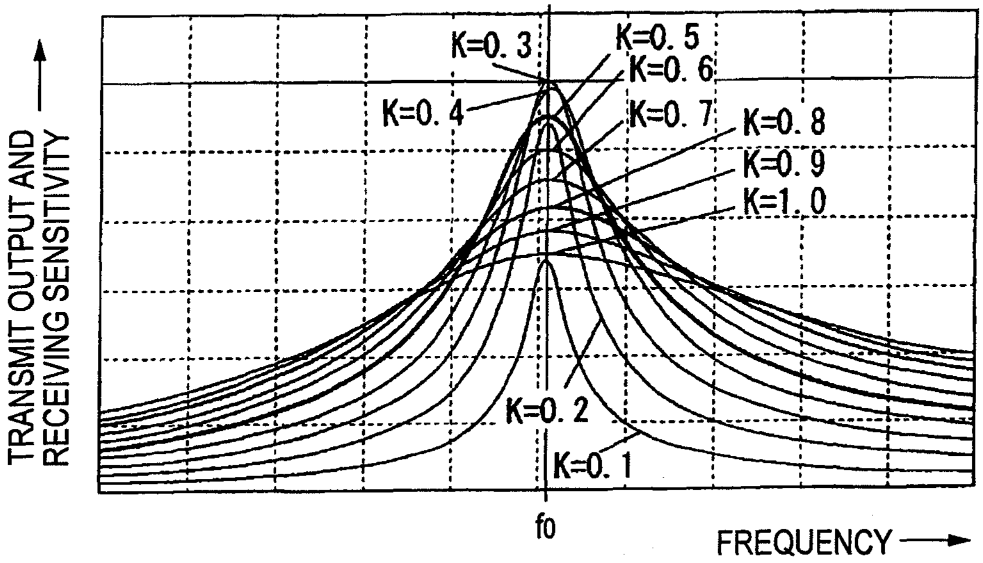
FIG. 10 is a frequency characteristic diagram of a transmit output & a receiving sensitivity of the transmitting/receiving antenna with respect to a coupling coefficient K.

Also, a diagram showing the frequency characteristic in Embodiment 1 is FIG. 10. The frequency characteristic is substantially identical to the characteristic that is obtained by multiplying the characteristic of the secondary current I2 shown in FIG. 9 by the secondary inductance L2.

Figure 11:
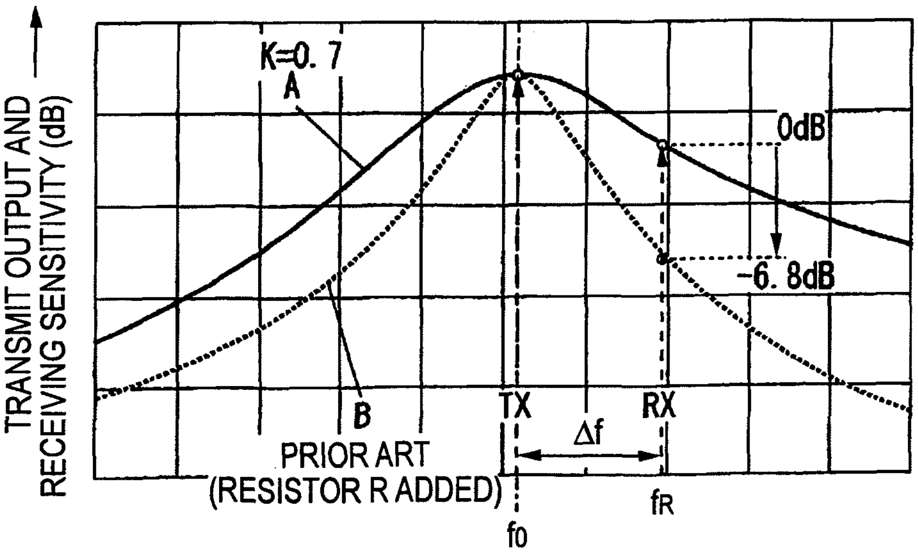
FIG. 11 is a frequency characteristic diagram of a transmit output & a receiving sensitivity of the transmitting/receiving antenna with respect to a coupling coefficient K.

Here, the prior art (B line) when the frequency characteristic is widened by using a resistor R and Embodiment 1 (A line) are compared mutually by reference to FIG. 11. It is understood that, as shown in FIG. 11, a transmit power TX and a receiving sensitivity RX are increased larger than the prior art, and the frequency characteristic has a wider frequency band than the prior art.

That is, in Embodiment 1, unlike the prior art, the resistor is not interposed into the transmitting/receiving channel of the transmitting/receiving antenna 3. Therefore, a reduction of the power consumption can be attained.

Also, in Embodiment 1, the wider frequency band in the frequency characteristic can be implemented by adjusting the coupling coefficient K between the driven loop antenna 12 and the transmitting/receiving loop antenna 14.

Figure 12:
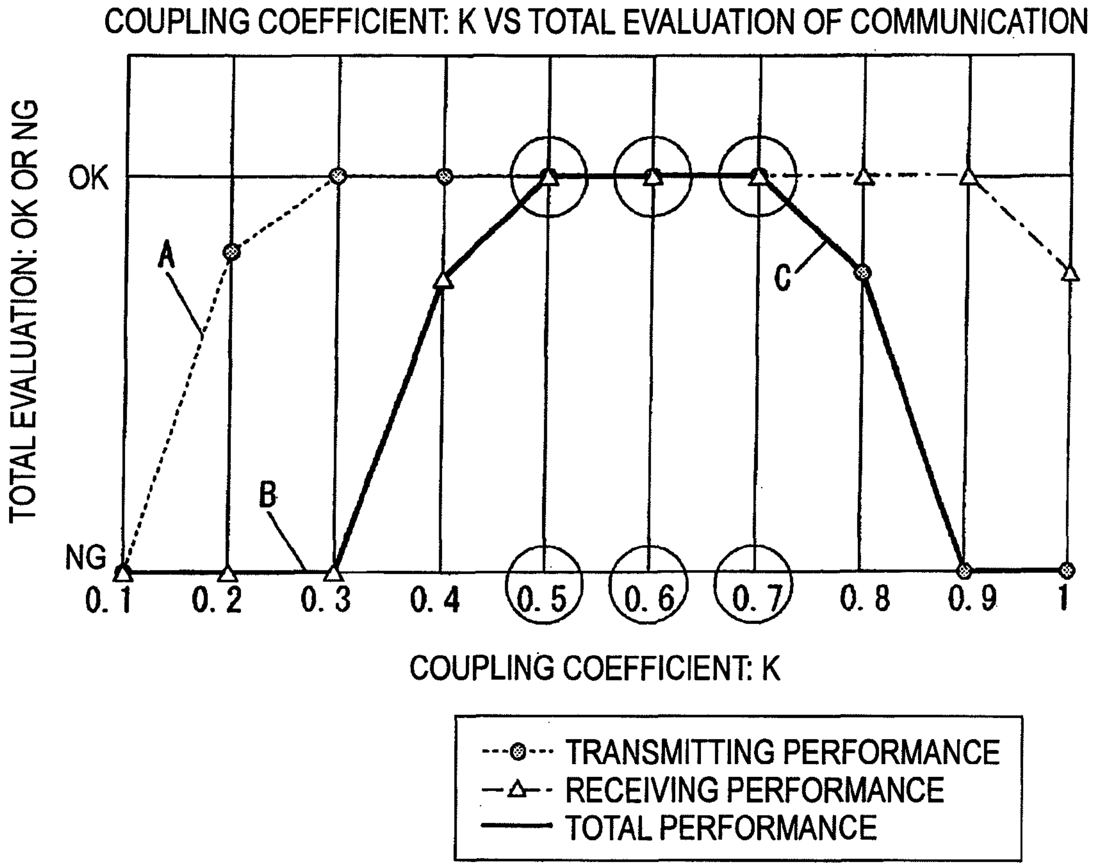
FIG. 12 is a chart of a coupling coefficient K and a total evaluation of communication.
Figure 13:
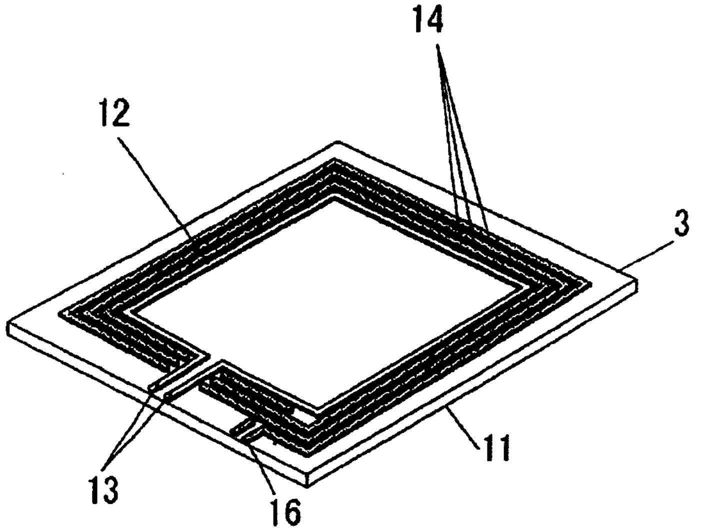
FIG. 13 is a perspective view showing a transmitting/receiving antenna of a non-contact IC card system according to Embodiment 2 of the present invention.
Figure 14:
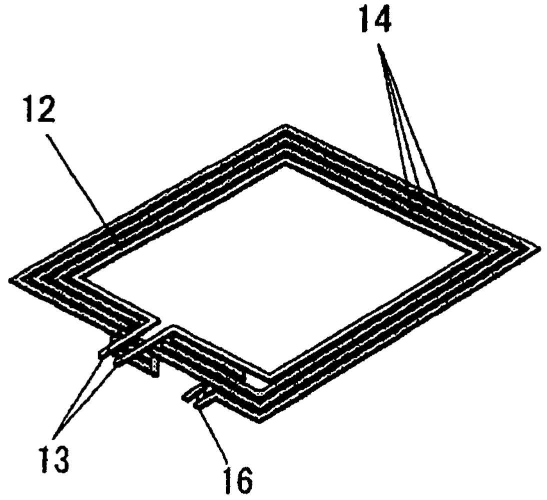
FIG. 14 is a perspective view of the principal part of the transmitting/receiving antenna.
Figure 15:
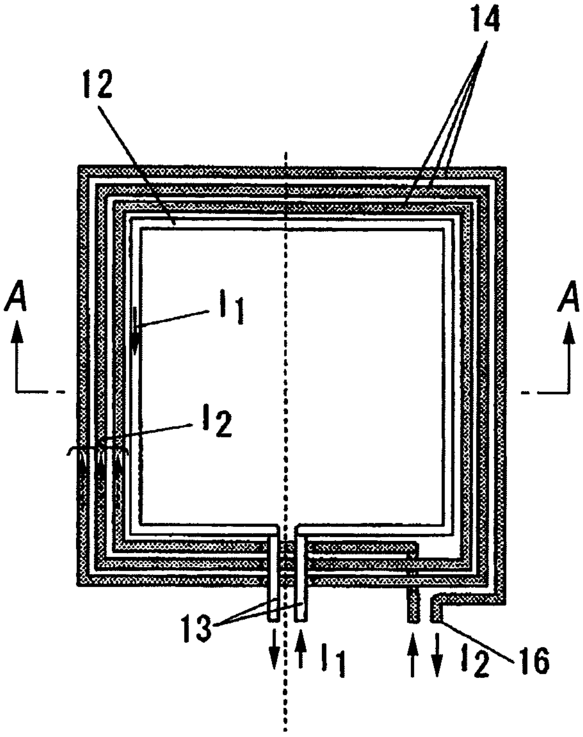
FIG. 15 is a plan view of the principal part of the transmitting/receiving antenna.
Figure 16:
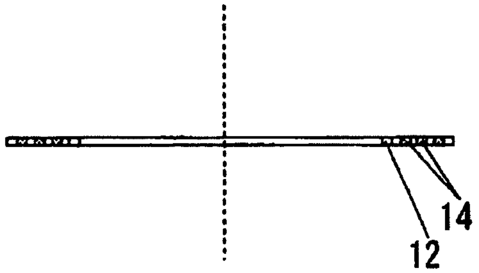
FIG. 16 is a sectional view of the principal part of the transmitting/receiving antenna (sectional view taken along an A-A line in FIG. 15).
Figure 17:
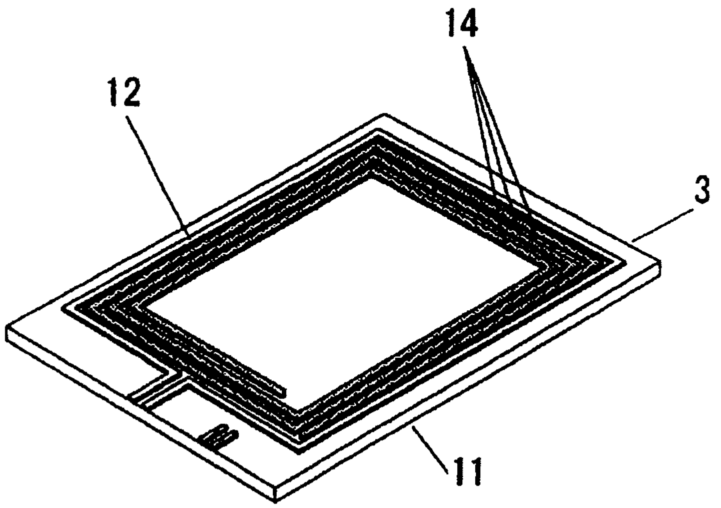
FIG. 17 is a perspective view showing a transmitting/receiving antenna of a non-contact IC card system according to Embodiment 3 of the present invention.
Figure 18:
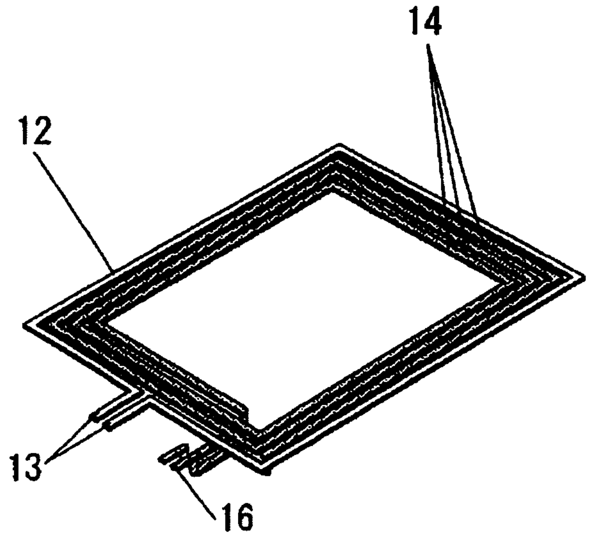
FIG. 18 is a perspective view of the principal part of the transmitting/receiving antenna.
Figure 19:
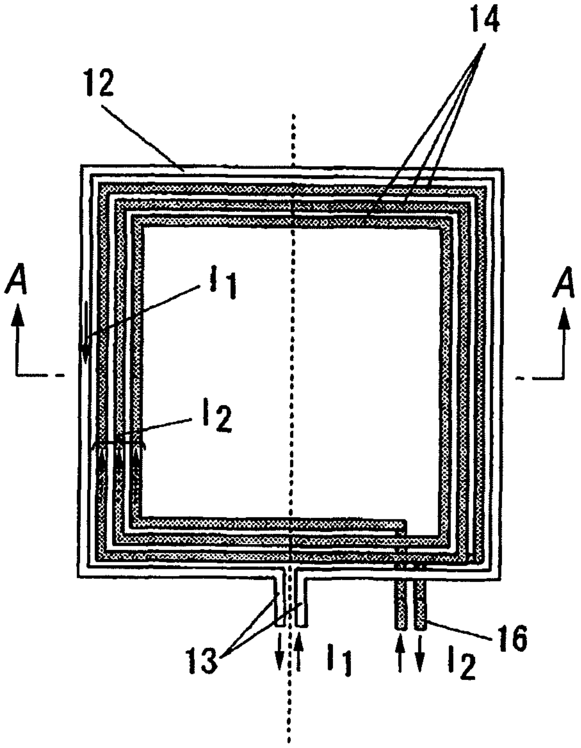
FIG. 19 is a plan view of the principal part of the transmitting/receiving antenna.
Figure 20:
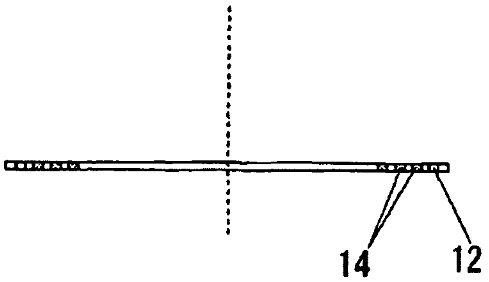
FIG. 20 is a sectional view of the principal part of the transmitting/receiving antenna (sectional view taken along an A-A line in FIG. 19).
Figure 21:
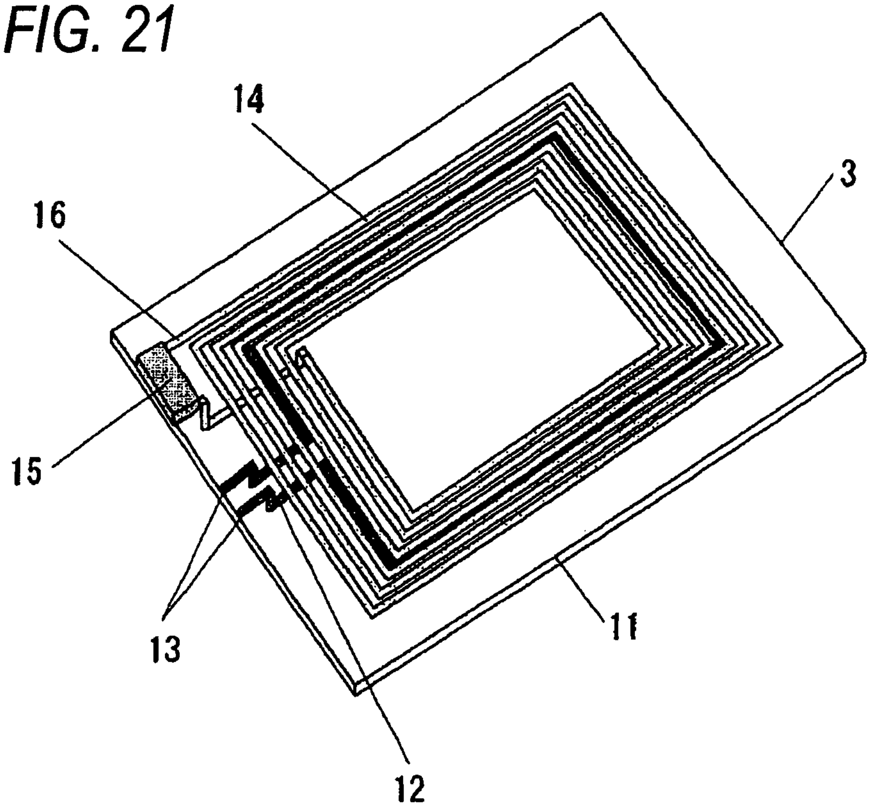
FIG. 21 is a perspective view showing a transmitting/receiving antenna of a non-contact IC card system according to Embodiment 4 of the present invention.
Figure 22:
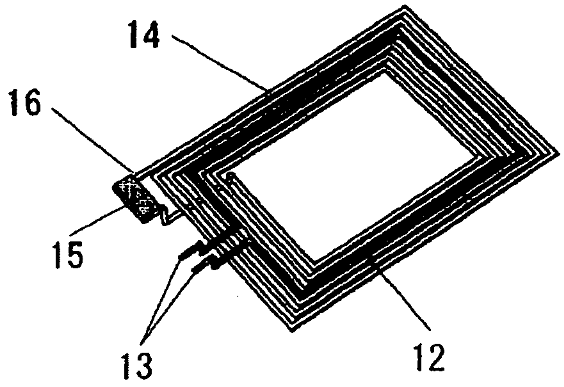
FIG. 22 is a perspective view of the principal part of the transmitting/receiving antenna.
Figure 23:
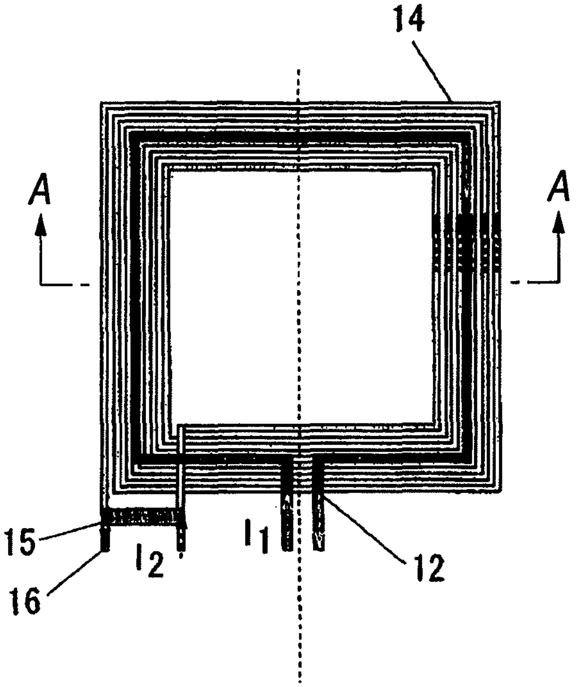
FIG. 23 is a plan view of the principal part of the transmitting/receiving antenna.
Figure 24:
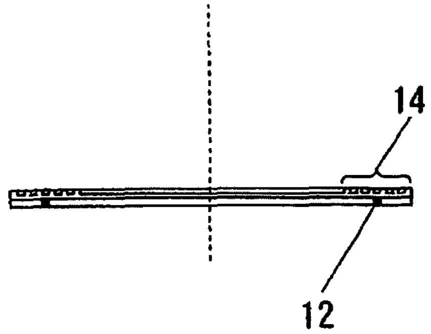
FIG. 24 is a sectional view of the principal part of the transmitting/receiving antenna (sectional view taken along an A-A line in FIG. 21).

Next, an optimum value of the coupling coefficient K will be explained with reference to FIG. 12 hereunder. FIG. 12 shows curves indicating the transmitting performance of the transmit signal to the radio communication medium 1, the receiving performance of a response signal from the radio communication medium 1, and the total communication performance as a total sum of these performances respectively, while using the coupling coefficient K as a parameter. Here, an A-line indicates the transmitting performance, a B-line indicates the receiving performance, and a C-line indicates the total communication performance.

The consideration given based on FIG. 12 shows that the transmitting performance (A line) shows the good curve in a range of K=0.3 to 0.7 and the receiving performance (B line) shows the good curve in a range of K=0.5 to 0.9.

As a result, the total communication performance that takes account of the transmission/reception is optimum at the coupling coefficient K=0.5 to 0.7. In the configuration of Embodiment 1, roughly K=0.7 is given and the good communication performance can be provided.

As described above, in Embodiment 1, according to the above configuration, since the coupling coefficient K between the driven loop antenna 12 and the transmitting/receiving loop antenna 14 is set largely such that a large current is fed to the transmitting/receiving loop antenna 14, the wider frequency band of the frequency characteristic can be implemented.

Also, the transmitting/receiving antenna 3 is constructed by forming the driven loop antenna 12 and the transmitting/receiving loop antenna 14 on a surface of the dielectric board 11 in terms of the printing. Therefore, a reduction of thickness of the transmitting/receiving antenna 3 can be achieved.

Also, in Embodiment 1, the receive processing portion connection terminal 16 is connected only to the end, which is located at a long distance from the transmit processing portion connection terminal 13, out of both ends of the transmitting/receiving loop antenna 14. Therefore, this arrangement makes it difficult for the transmit signal, which is fed from the transmit processing portion connection terminal 13, to cause the crosstalk with the signal on the receive processing portion connection terminal 16 side and, as a result, reliability of the communication can be improved.

That is, in Embodiment 1, both ends of the driven loop antenna 12 and both ends of the transmitting/receiving loop antenna 14 are shaped such that these ends can be led to the outside of the dielectric board 11 at one side of the rectangular dielectric board 11. In this condition, the transmit processing portion connection terminal 13 is connected to both ends of the driven loop antenna 12, and the receive processing portion connection terminal 16 is connected only to one end of both ends of the transmitting/receiving loop antenna 14.

However, in this case, the transmit processing portion connection terminal 13 and the receive processing portion connection terminal 16 are located in close vicinity to each other. In order to avoid such event, in Embodiment 1, the receive processing portion connection terminal 16 is connected only to one end, which is located at a long distance from the transmit processing portion connection terminal 13, out of both ends of the transmitting/receiving loop antenna 14. Therefore, this arrangement makes it difficult for the transmit signal, which is fed from the transmit processing portion connection terminal 13, to cause the crosstalk with the signal on the receive processing portion connection terminal 16 side and, as a result, reliability of the communication can be improved.

Also, in Embodiment 1, the resonance capacitor 15 is mounted/connected to both ends of the transmitting/receiving loop antenna 14 in the direction that intersects orthogonally with the transmit processing portion connection terminal 13. Therefore, the receive processing portion connection terminal 16 is connected to the end, which is located at a long distance from the driven loop antenna 12, out of both ends of the resonance capacitor 15.

(Embodiment 2)

FIG. 13 to FIG. 16 show Embodiment 2 of the present invention. Here, in FIG. 14 to FIG. 16, the dielectric board 11 is not illustrated on purpose so as to clarify structures of the driven loop antenna 12 and the transmitting/receiving loop antenna 14 and their mutual relationship.

Also, in Embodiment 2, the transmitting/receiving antenna 3 is constructed to include the dielectric board 11, the driven loop antenna 12 provided on the surface of the dielectric board 11 by the printing, the transmit processing portion connection terminal 13 connected to the driven loop antenna 12, the transmitting/receiving loop antenna 14 arranged in close vicinity to the driven loop antenna 12 in a non-contact state, the resonance capacitor (similar to 15 in FIG. 2 although not shown) connected to both ends of the transmitting/receiving loop antenna 14, and the receive processing portion connection terminal 16 connected to the transmitting/receiving loop antenna 14.

Also, the transmit processing portion 10 in FIG. 1 is connected to the transmit processing portion connection terminal 13. Also, the receive processing portion 9 in FIG. 1 is connected to the receive processing portion connection terminal 16.

Also, as shown in FIG. 13 to FIG. 16, the driven loop antenna 12 is constructed to have the loop that is wound in a single turn, and the transmitting/receiving loop antenna 14 is constructed to have the loop that is wound in plural turns.

More concretely, as shown in FIG. 13 to FIG. 16, the driven loop antenna 12 is arranged on the inner side of the transmitting/receiving loop antenna 14 and is surrounded by the transmitting/receiving loop antenna 14. According to this configuration, the coupling coefficient K becomes almost K=0.5. As can be understood from FIG. 12, this configuration can give the good communication performance.

Also, in Embodiment 2, the receive processing portion connection terminal 16 may be connected only to the end, which is located at a long distance from the transmit processing portion connection terminal 13, out of both ends of the transmitting/receiving loop antenna 14. Therefore, this arrangement makes it difficult for the transmit signal, which is fed from the transmit processing portion connection terminal 13, to cause the crosstalk with the signal on the receive processing portion connection terminal 16 side and, as a result, reliability of the communication can be improved.

As described above, in Embodiment 2, according to the above configuration, since the coupling coefficient K between the driven loop antenna 12 and the transmitting/receiving loop antenna 14 is set largely such that a large current is fed to the transmitting/receiving loop antenna 14, the wider frequency band of the frequency characteristic can be implemented.

Also, the transmitting/receiving antenna 3 is constructed by forming the driven loop antenna 12 and the transmitting/receiving loop antenna 14 on a surface of the dielectric board 11 in terms of the printing. Therefore, a reduction of thickness of the transmitting/receiving antenna 3 can be achieved.

(Embodiment 3)

FIG. 17 to FIG. 20 show Embodiment 3 of the present invention. Here, in FIG. 18 to FIG. 20, the dielectric board 11 is not illustrated on purpose to clarify the structures of the driven loop antenna 12 and the transmitting/receiving loop antenna 14 and their mutual relationship.

Also, in Embodiment 2, the transmitting/receiving antenna 3 is constructed to include the dielectric board 11, the driven loop antenna 12 provided on the surface of the dielectric board 11 by the printing, the transmit processing portion connection terminal 13 connected to the driven loop antenna 12, the transmitting/receiving loop antenna 14 arranged in close vicinity to the driven loop antenna 12 in a non-contact state, the resonance capacitor (similar to 15 in FIG. 2 although not shown) connected to both ends of the transmitting/receiving loop antenna 14, and the receive processing portion connection terminal 16 connected to the transmitting/receiving loop antenna 14.

Also, the transmit processing portion 10 in FIG. 1 is connected to the transmit processing portion connection terminal 13. Also, the receive processing portion 9 in FIG. 1 is connected to the receive processing portion connection terminal 16.

Also, as shown in FIG. 17 to FIG. 20, the driven loop antenna 12 is constructed to have the loop that is wound in a single turn, and the transmitting/receiving loop antenna 14 is constructed to have the loop that is wound in plural turns.

More concretely, as shown in FIG. 17 to FIG. 20, the driven loop antenna 12 is arranged on the outer side of the transmitting/receiving loop antenna 14 to surround the transmitting/receiving loop antenna 14. According to this configuration, the coupling coefficient K becomes almost K=0.5. As can be understood from FIG. 12, this configuration can give the good communication performance.

Also, in Embodiment 3, the receive processing portion connection terminal 16 may be connected only to the end, which is located at a long distance from the transmit processing portion connection terminal 13, out of both ends of the transmitting/receiving loop antenna 14. Therefore, this arrangement makes it difficult for the transmit signal, which is fed from the transmit processing portion connection terminal 13, to cause the crosstalk with the signal on the receive processing portion connection terminal 16 side and, as a result, reliability of the communication can be improved.

As described above, in Embodiment 3, according to the above configuration, since the coupling coefficient K between the driven loop antenna 12 and the transmitting/receiving loop antenna 14 is set largely such that a large current is fed to the transmitting/receiving loop antenna 14, the wider frequency band of the frequency characteristic can be implemented.

Also, the transmitting/receiving antenna 3 is constructed by forming the driven loop antenna 12 and the transmitting/receiving loop antenna 14 on a surface of the dielectric board 11 in terms of the printing. Therefore, a reduction of thickness of the transmitting/receiving antenna 3 can be achieved.

(Embodiment 4)

FIG. 21 to FIG. 24 show Embodiment 4 of the present invention. Here, in FIG. 22 to FIG. 24, the dielectric board 11 is not illustrated on purpose so as to clarify structures of the driven loop antenna 12 and the transmitting/receiving loop antenna 14 and their mutual relationship.

Also, in Embodiment 4, the transmitting/receiving antenna 3 is constructed to include the dielectric board 11, the driven loop antenna 12 provided on a surface of the dielectric board 11 by the printing, the transmit processing portion connection terminal 13 connected to the driven loop antenna 12, the transmitting/receiving loop antenna 14 arranged in close vicinity to the driven loop antenna 12 in an electrically non-contact state, the resonance capacitor 15 connected to both ends of the transmitting/receiving loop antenna 14, and the receive processing portion connection terminal 16 connected to the transmitting/receiving loop antenna 14.

Also, the transmit processing portion 10 in FIG. 1 is connected to the transmit processing portion connection terminal 13. Also, the receive processing portion 9 in FIG. 1 is connected to the receive processing portion connection terminal 16.

Also, the driven loop antenna 12 shown in FIG. 21 to FIG. 24 is constructed to have the rectangular loop wound in a single turn, and the transmitting/receiving loop antenna 14 is constructed to have the rectangular loop wound in plural turns.

More concretely, as shown in FIG. 21 to FIG. 24, the driven loop antenna 12 is provided on the inner layer of the radio communication medium 1.

Also, the transmitting/receiving loop antenna 14 is provided on the surface of the dielectric board 11.

As described above, in Embodiment 4, according to the above configuration, since the coupling coefficient K between the driven loop antenna 12 and the transmitting/receiving loop antenna 14 is set largely such that a large current is fed to the transmitting/receiving loop antenna 14, the wider frequency band of the frequency characteristic can be implemented.

Also, because the transmitting/receiving antenna 3 is constructed by forming the driven loop antenna 12 and the transmitting/receiving loop antenna 14 on a surface of the dielectric board 11 by means of the printing, a reduction of thickness of the transmitting/receiving antenna 3 can be achieved.

Also, since the driven loop antenna 12 is formed on the inner layer of the dielectric board 11 by the printing and the transmitting/receiving loop antenna 14 is formed on the surface of the dielectric board 11 by the printing, a reduction of thickness of the transmitting/receiving antenna 3 can be achieved.

Further, in Embodiment 4, the driven loop antenna 12 and the transmitting/receiving loop antenna 14 are formed on different surfaces of the dielectric board 11 respectively. Therefore, under the condition that there is a limit to a size of the dielectric board 11, respective sizes and shapes of the driven loop antenna 12 and the transmitting/receiving loop antenna 14 can be set appropriately such that the coupling coefficient K between them can be set adequately.

As a result, a wider frequency band of the frequency characteristic and a reduction of the power consumption can be readily achieved.

In this case, as described above, the transmitting/receiving antenna 3 in Embodiment 4 is constructed by forming respectively the driven loop antenna 12 on the inner layer of the dielectric board 11 by the printing and the transmitting/receiving loop antenna 14 on the surface of the dielectric board 11 by the printing. As a result, a communication efficiency can be increased by reducing a distance between the transmitting/receiving loop antenna 4 of the radio communication medium 1 and the transmitting/receiving loop antenna 14.

Of course, the transmitting/receiving loop antenna 14 may be formed on the inner layer of the dielectric board 11 by the printing, and the driven loop antenna 12 may be formed on the surface of the dielectric board 11 by the printing. Further, either of them may be formed on the back surface of the dielectric board 11.

In summary, it is important that the driven loop antenna 12 and the transmitting/receiving loop antenna 14 should be formed on the different surfaces of the dielectric board 11.

Also, in Embodiment 4, the receive processing portion connection terminal 16 may be connected only to the end, which is located at a long distance from the transmit processing portion connection terminal 13, out of both ends of the transmitting/receiving loop antenna 14. Therefore, this arrangement makes it difficult for the transmit signal, which is fed from the transmit processing portion connection terminal 13, to cause the crosstalk with the signal on the receive processing portion connection terminal 16 side and, as a result, reliability of the communication can be improved.

That is, in Embodiment 4, both ends of the driven loop antenna 12 and both ends of the transmitting/receiving loop antenna 14 are shaped such that these ends can be led to the outside of the dielectric board 11 at the one side of the rectangular dielectric board 11. In this condition, the transmit processing portion connection terminal 13 is connected to both ends of the driven loop antenna 12, and the receive processing portion connection terminal 16 is connected only to one end of both ends of the transmitting/receiving loop antenna 14.

However, in this case, the transmit processing portion connection terminal 13 and the receive processing portion connection terminal 16 are located in close vicinity to each other. In order to avoid such situation, in Embodiment 4, the receive processing portion connection terminal 16 is connected only to one end, which is located at a long distance from the transmit processing portion connection terminal 13, out of both ends of the transmitting/receiving loop antenna 14. Therefore, this arrangement makes it difficult for the transmit signal, which is fed from the transmit processing portion connection terminal 13, to cause the crosstalk with the signal on the receive processing portion connection terminal 16 side and, as a result, reliability of the communication can be improved.

In above Embodiments 1 to 4, the driven loop antenna 12 and the transmitting/receiving loop antenna 14 are shaped into the rectangular loop antenna respectively. In this case, the similar advantages can be achieved if these antennas are shaped into the circular or elliptic loop antenna.

As described above, the transmitting/receiving antenna of the present invention is constructed to include the dielectric board, the driven loop antenna provided to the dielectric board, the transmit processing portion connection terminals connected to the driven loop antenna, the transmitting/receiving loop antenna arranged in close vicinity to the driven loop antenna in a non-contact state, the resonance capacitor connected to both ends of the transmitting/receiving loop antenna, and the receive processing portion connection terminal connected to the transmitting/receiving loop antenna. Also, the driven loop antenna is constructed to have the rectangular loop wound in a single turn and the transmitting/receiving loop antenna is constructed to have the rectangular loop wound in plural turns. Therefore, a wider frequency band of the frequency characteristic and a reduction of the power consumption can be achieved.

Also, the transmitting/receiving antenna of the present invention is constructed to include the dielectric board, the driven loop antenna provided to the dielectric board, the transmit processing portion connection terminals connected to the driven loop antenna, the transmitting/receiving loop antenna arranged in close vicinity to the driven loop antenna in a non-contact state, the resonance capacitor connected to both ends of the transmitting/receiving loop antenna, and the receive processing portion connection terminal connected only to the end, which is located at a long distance from the transmit processing portion connection terminal, out of both ends of the transmitting/receiving loop antenna. Also, the driven loop antenna is constructed to have the rectangular loop wound in a single turn and the transmitting/receiving loop antenna is constructed to have the rectangular loop wound in plural turns. Therefore, a wider frequency band of the frequency characteristic and a reduction of the power consumption can be achieved.

In other words, in the present invention, a wider frequency band of the frequency characteristic can be achieved by setting the coupling coefficient between the driven loop antenna and the transmitting/receiving loop antenna. Also, since the resistor used to attain such wider frequency band is not interposed into the transmitting/receiving channel of the transmitting/receiving antenna, a reduction of the power consumption can be achieved.

Further, the driven loop antenna is constructed to have the rectangular loop wound in a single turn, and also the transmitting/receiving loop antenna is constructed to have the rectangular loop wound in plural turns. Therefore, a reduction of the power consumption can also be achieved from this respect.

More particularly, the direction of the electric current flowing through the driven loop antenna is in the opposite direction of the electric current flowing through the transmitting/receiving loop antenna. Therefore, the magnetic flux generated as the result that the electric current flows through the driven loop antenna acts to weaken the magnetic flux generated as the result that the electric current flows through the transmitting/receiving loop antenna.

In order to avoid such situation, in the present invention, the event that the magnetic flux of the transmitting/receiving loop antenna is weakened is suppressed by constructing the driven loop antenna to have the loop wound in a single turn.

As a result, even though a transmitting power from the driven loop antenna is not enhanced, the sufficient magnetic flux is generated from the transmitting/receiving loop antenna, and thus the power consumption can be reduced. Also, in the present invention, the receive processing portion connection terminal is connected only to the end, which is located at a long distance from the transmit processing portion connection terminal, out of both ends of the transmitting/receiving loop antenna. Therefore, this arrangement makes it difficult for the transmit signal, which is fed from the transmit processing portion connection terminal, to cause the crosstalk with the signal on the receive processing portion connection terminal 16 side and, as a result, reliability of the communication can be improved.

Further, in the present invention, the driven loop antenna and the transmitting/receiving loop antenna are formed on different surfaces of the dielectric board respectively. Therefore, under the condition that there is a limit to a size of the dielectric board, respective sizes and shapes of the driven loop antenna and the transmitting/receiving loop antenna can be set appropriately such that the coupling strength between them can be set adequately.

As a result, a wider frequency band of the frequency characteristic and a reduction of the power consumption can be readily achieved.

Also, the transmitting/receiving device of the present invention is constructed to include the transmitting/receiving antenna, the transmit processing portion connected to the transmit processing portion connection terminals of the transmitting/receiving antenna, the receive processing portion connected to the receive processing portion connection terminal of the transmitting/receiving antenna, and the controlling portion connected to the receive processing portion and the transmit processing portion. Therefore, for the same reason as the mentioned above, a wider frequency band of the frequency characteristic and a reduction of the power consumption can be achieved.

This application is based upon and claims the benefit of priority of Japanese Patent Application No 2009-263737 filed on Sep. 11, 1919, No 2009-263738 filed on Sep. 11, 1919, No 2009-263739 filed on Sep. 11, 1919, the contents of which are incorporated herein by reference in its entirety.

What is claimed is:

1. A transmitting/receiving antenna device, comprising:

a dielectric board;

a driven loop antenna, which is formed by a conductor, provided to the dielectric board;

a transmission processor connection terminal connected to the driven loop antenna;

a transmission processor, which is connected to the transmission processor connection terminal;

a transmitting/receiving loop antenna, which is formed by a conductor, arranged in close vicinity to the driven loop antenna in a non-contact state;

a resonance capacitor connected to both ends of the transmitting/receiving loop antenna; and a receiving processor connection terminal connected to the transmitting/receiving loop antenna;

a receiving processor, which is connected to the receiving processor connection terminal;

wherein the driven loop antenna is constructed to have a loop wound in a single loop, and the transmitting/receiving loop antenna is constructed to have a loop wound in plural loops, the driven loop antenna and the transmitting/receiving loop antenna generating a mutual inductance between the driven loop antenna and the transmitting/receiving loop antenna.

2. The transmitting/receiving antenna according to claim 1, wherein a loop center of the driven loop antenna coincides with a loop center of the transmitting/receiving loop antenna.

3. The transmitting/receiving antenna according to claim 1, wherein L2 is ten times or more larger than L1 (L2≧10×L1), where L1 is an inductance of the driven loop antenna, and L2 is an inductance of the transmitting/receiving loop antenna.

4. The transmitting/receiving antenna according to claim 1, wherein a coupling coefficient K of an electromagnetic coupling, which is caused due to a mutual induction between the driven loop antenna and the transmitting/receiving loop antenna, is set to K=0.5 to 0.7.

5. The transmitting/receiving antenna according to claim 1, wherein the transmitting/receiving loop antenna is constructed by an inner loop antenna and an outer loop antenna arranged on an outer side of the inner loop antenna, and the driven loop antenna is arranged between the inner loop antenna and the outer loop antenna.

6. The transmitting/receiving antenna according to claim 1, wherein the driven loop antenna is arranged on an inner side of the transmitting/receiving loop antenna.

7. The transmitting/receiving antenna according to claim 1, wherein the driven loop antenna is arranged on an outer side of the transmitting/receiving loop antenna.

8. The transmitting/receiving antenna according to claim 1, wherein the driven loop antenna and the transmitting/receiving loop antenna are formed on a same plane of the dielectric board.

9. The transmitting/receiving antenna according to claim 1, wherein the driven loop antenna and the transmitting/receiving loop antenna are not formed on a same plane of the dielectric board.

10. The transmitting/receiving antenna according to claim 9, wherein one of the driven loop antenna and the transmitting/ receiving loop antenna is formed on a surface of the dielectric board, and other is formed on a back surface of the dielectric board.

11. The transmitting/receiving antenna according to claim 9, wherein one of the driven loop antenna and the transmitting/ receiving loop antenna is formed on a surface of the dielectric board, and other is formed in an inner layer of the dielectric board.

12. The transmitting/receiving antenna according to claim 1, wherein the receiving processor connection terminal is connected only to an end, which is located at a long distance from the transmission processor connection terminal, out of both ends of the transmitting/receiving loop antenna.

13. A transmitting/receiving device, comprising:

a dielectric board;

a driven loop antenna, which is formed by a conductor, provided to the dielectric board, and having a loop wound in a single loop;

a transmitting/receiving loop antenna, which is formed by a conductor, arranged in close vicinity to the driven loop antenna in a non-contact state, and having a loop wound in plural loops;

a resonance capacitor connected to both ends of the transmitting/receiving loop antenna;

a transmission processor, which is connected to a transmission processor connection terminal of the driven loop antenna;

a receiving processor, which is connected to a receiving processor connection terminal of the transmitting/receiving loop antenna; and a controller, which is connected to the receiving processor and to the transmission processor, wherein the driven loop antenna and the transmitting/receiving loop antenna generate a mutual inductance between the driven loop antenna and the transmitting/receiving loop antenna.

* * * * *